Oct. 18, 1960 C. D. MILLER 2,956,808
POWER TAKE-OFF SPREADER
Filed Feb. 21, 1956 4 Sheets-Sheet 2

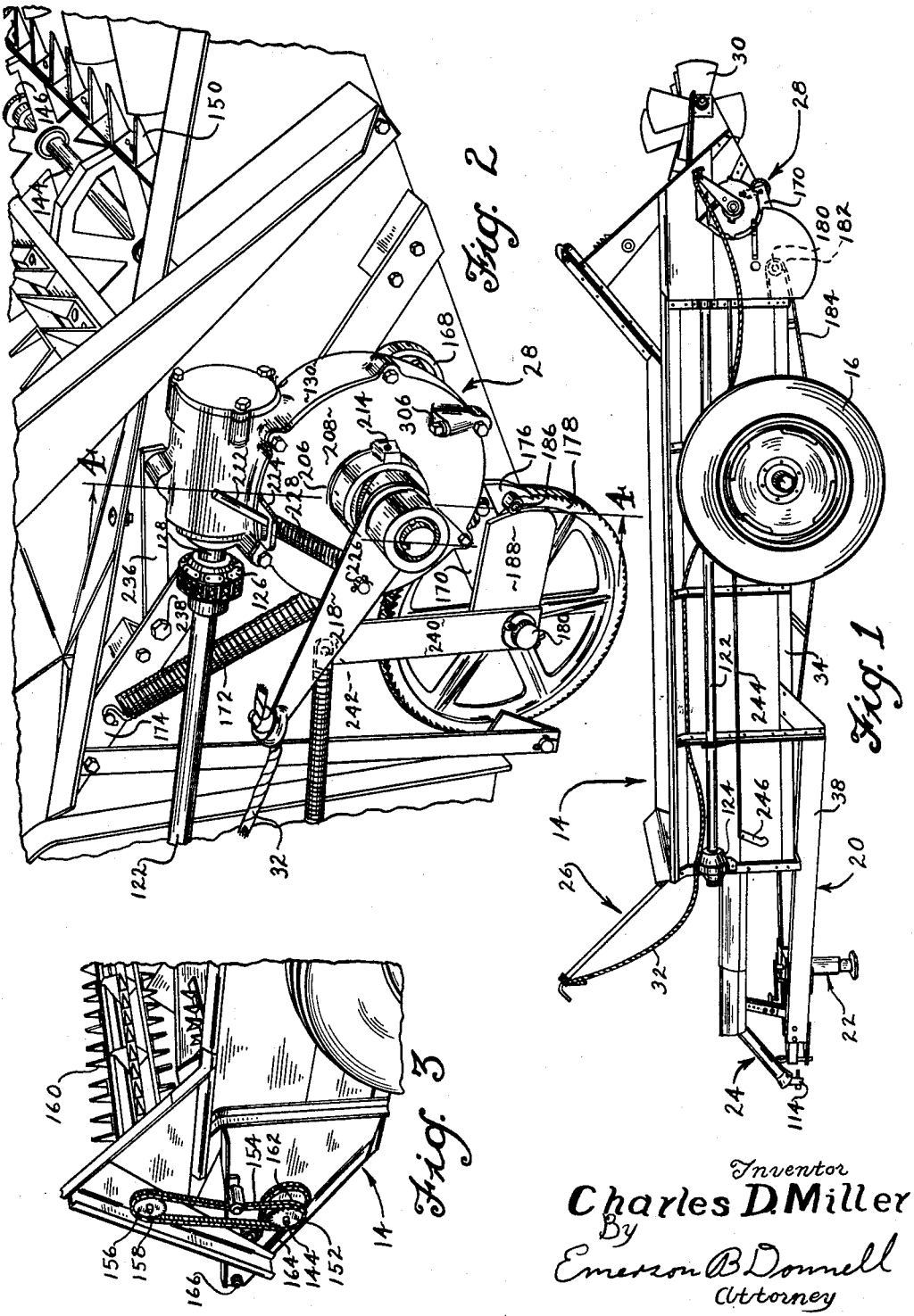

Inventor
Charles D. Miller
By
Emerson B. Donnell
Attorney

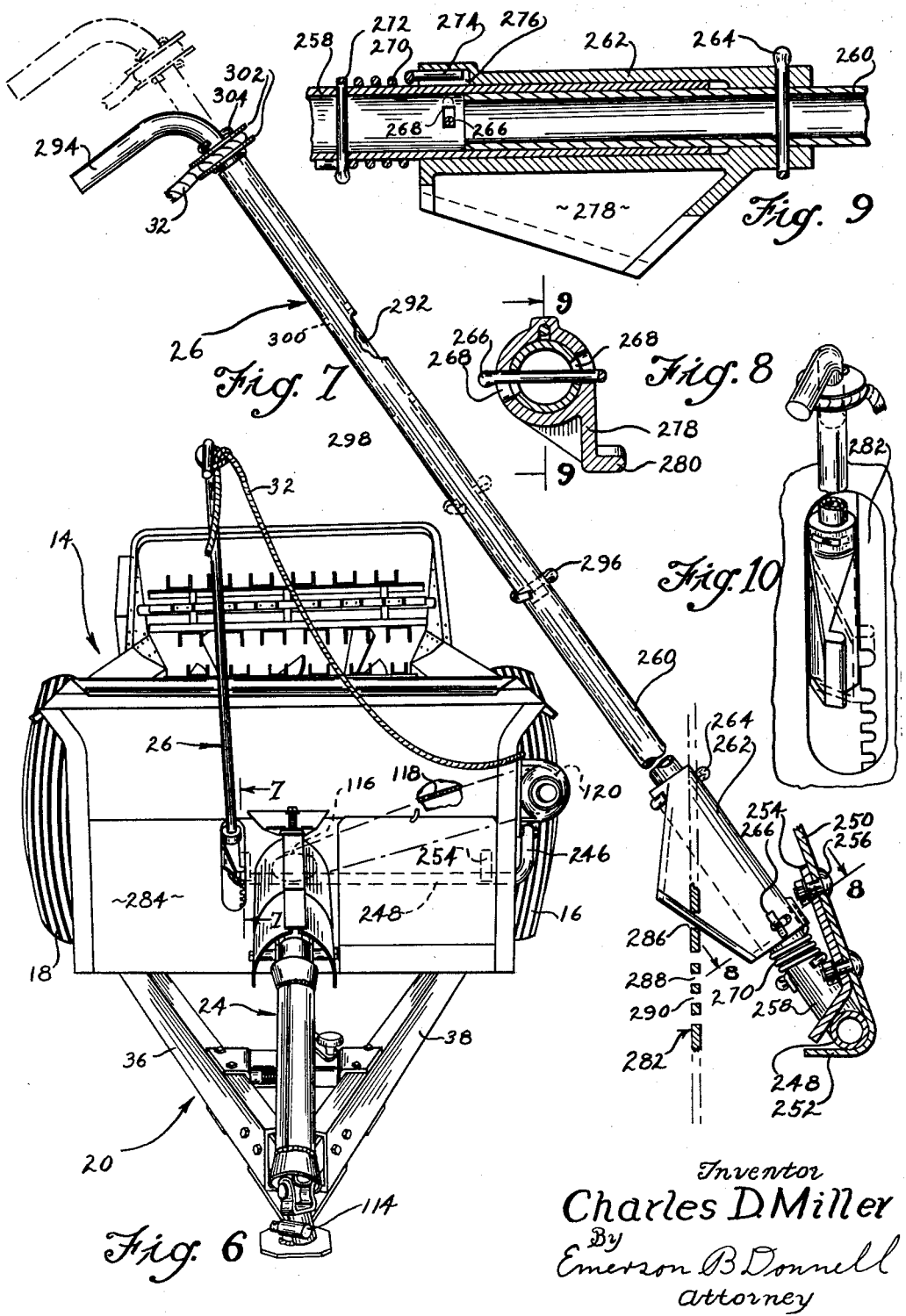

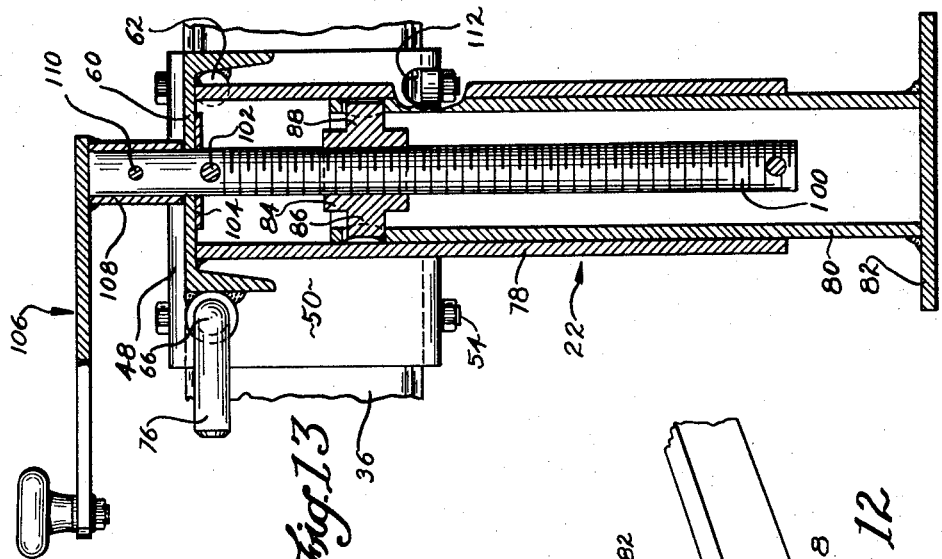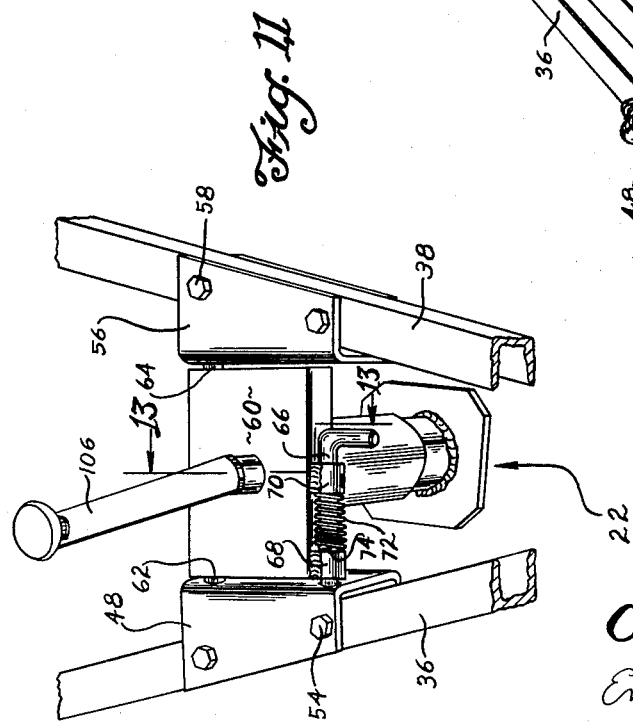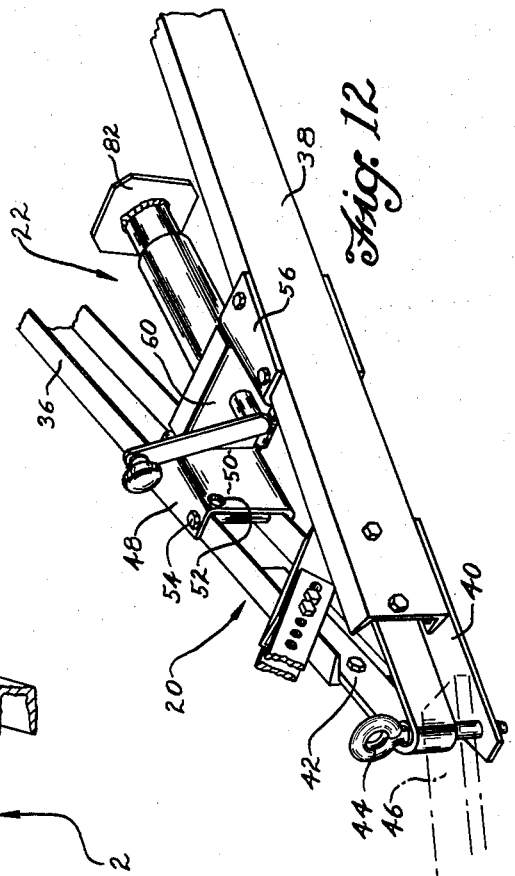

United States Patent Office
2,956,808
Patented Oct. 18, 1960

2,956,808
POWER TAKE-OFF SPREADER

Charles D. Miller, Rockford, Ill., assignor to J. I. Case Company, Racine, Wis., a corporation of Wisconsin Filed Feb. 21, 1956, Ser. No. 566,873

3 Claims. (Cl. 275—6)

The present invention relates to manure spreaders, and an object thereof is to generally improve the construction and operation of devices of this class.

More particularly, an object is to improve that class of spreaders which are drawn by a tractor, and in which the feeding and spreading mechanism is driven from the power take-off of the tractor, and in which the control of the components of the spreader is centered at a point adjacent to the tractor so that it can be effected by the tractor operator without dismounting from the tractor. The inertia of the spreading units, and the power of the tractor are both substantial, and another object of the invention is to provide a safeguard so that the resulting possible extreme forces cannot be inadvertently applied so as to damage the mechanism.

A further object is to provide a novel drive mechanism which is not adversely affected by the twisting and weaving of the box-like spreader structure.

Further objects and advantages will become apparent from the following description and annexed drawings in which an illustrative embodiment of the invention is shown, it being understood, however, that the invention is not to be considered as limited in any manner except as defined in the claims.

Similar reference characters have been applied to the same parts whereever they occur throughout the specification and drawings in which:

Fig. 1 is a left side elevation of a spreader embodying the invention.

Fig. 2 is an enlarged perspective of a portion of the construction of Fig. 1, taken from the rear and from the left with a cover plate removed.

Fig. 3 is a similar view taken from the right looking toward the rear.

Fig. 6 is a front view in perspective, with parts broken away, on an enlarged scale as compared with Fig. 5, of a spreader embodying the invention.

Fig. 7 is a left side elevation on an enlarged scale with parts in section on the line 7—7 of Fig. 6, of a lever indicated in Figs. 1 and 6.

Fig. 8 is an enlarged sectional view on the line 8—8 of Fig. 7.

Fig. 9 is an axial sectional view taken on the line 9—9 of Fig. 8.

Fig. 10 is an enlarged front view of a portion of Fig. 6 with the parts in a different position.

Fig. 11 is a perspective view on an enlarged scale of a fragment of Fig. 6 with parts removed.

Fig. 12 is a perspective view of the same on an enlarged scale from a different viewpoint, and showing certain parts in a different position, and Fig. 13 is a vertical axial sectional view of a jack or stand shown in Figs. 11 and 12, on a further enlarged scale, substantially on the line 13—13 of Fig. 11.

Figure 4:
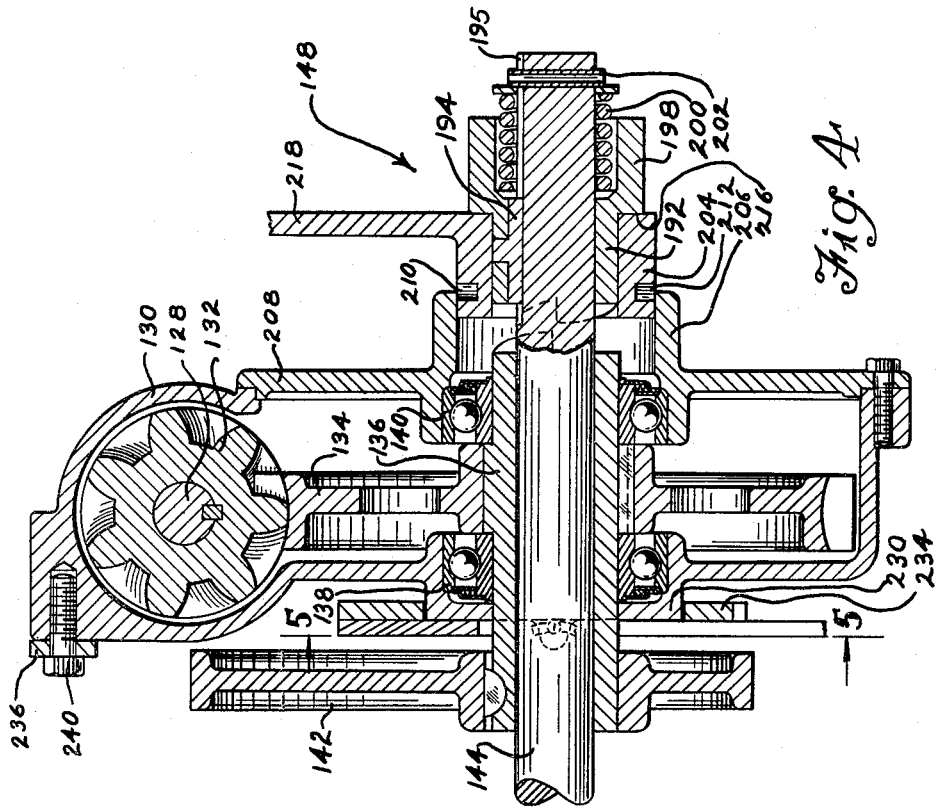
Fig. 4 is an enlarged fragmentary sectional view taken on the line 4—4 of Fig. 2.
Figure 5:
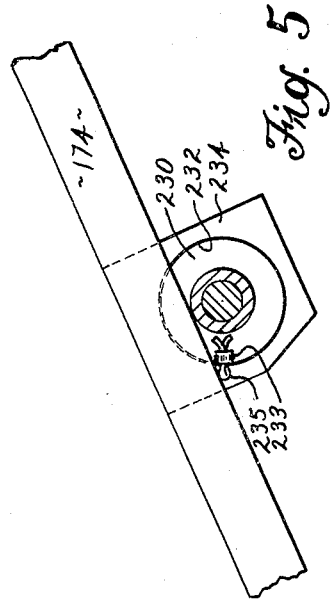
Fig. 5 is a fragmentary sectional view on a smaller scale, taken on the line 5—5 of Fig. 4.

The device as seen in Fig. 1 comprises a body or box portion of well-known form generally designated as 14 supported on a pair of ground engaging wheels 16 and 18 (Fig. 6) and a drawbar generally designated as 20, adapted to be attached to a tractor not shown, drawbar 20 being supported when no tractor is present on a stand or jack generally designated as 22.

The spreader has a power take-off connection or shaft generally designated as 24 receiving power from a tractor, an adjusting lever 26 for regulating the rate of feed of the material, gearing and clutch mechanism generally designated as 28 for driving and controlling the usual beaters and a widespread 30, and a rope or control 32 extending to the vicinity of the tractor for controlling the feed of material from that point. Thus a spreader has been provided which, while intended to be attached to and partially supported by a tractor, is firm and stable when not so supported, and which may be adjusted to the correct height to suit the individual tractor when it is desired to couple it to the tractor. The power of the tractor is used to operate the mechanism, thereby making possible a spreader of greater power than is practical when the mechanism is operated by ground contact, limited as it is by traction conditions. The latter is a double limitation in that a slippery field causes the spreader wheels to slip and fail to run the mechanism up to normal speed, while the extra drag of the spreader increases the likelihood of slipping of the tractor wheels. In the present arrangement a substantial share of the tractor power is transmitted to the spreader through the power take-off, while the spreader rolls freely on its wheels, without any drag from the burden of actuating the spreader mechanism.

Returning to a more detailed description of the spreader, body portion 14 includes a chassis 34, Fig. 1, which acts as a base or foundation to which the other parts are attached, drawbar 20 comprising converging side rails 36 and 38 united at their forward ends by a plate 40, Fig. 12, and a V strap 42, engaged with and supporting a hitch pin 44 of well-known type for connection with a tractor drawbar 46, strap 42 resting on drawbar 46 and imposing thereon a substantial portion of the weight of the spreader, and which weight must be supported in some other manner at such times as a tractor is not present. For this purpose stand 22 is provided.

Referring to Figs. 11, 12, and 13, a stand mounting bracket 48 has a plane substantially vertical face 50 having an opening 52, and fixed on side rail 36 as by bolts 54. A second bracket 56, which is preferably similar, is fixed on side rail 38 as by bolts 58, the brackets receiving between them a cap element 60, preferably a short piece of downwardly open channel section substantially filling the space between brackets 48 and 56 and having welded or otherwise suitably fixed thereto substantial pivots or pintles 62 and 64, journaled in suitable openings in brackets 48 and 56 respectively. A locking pin 66 is slidably carried in brackets 68 and 70 welded or otherwise fastened to cap element 60 and in one position is engaged in opening 52. In this manner cap element 60 is strongly fixed in a position substantially parallel to side rails 36 and 38. A spring 72 compressed between bracket 70 and a pin or the like 74 urges locking pin 66 continuously in the direction of opening 52, and a bent or grip portion 76 provides a convenient means for sliding the pin out of the opening when it is desired to disengage the cap element for rocking.

Cap element 60 has welded or otherwise fixed thereto a downwardly extending, in the present instance tubular, housing 78, within which is a telescopic, also tubular housing 80 provided with a foot-piece or base 82 providing an extended area to contact the ground and support the weight imposed on drawbar 20. Housing 80 has a nut 84 provided with trunnions 86 and 88 engaged in suitable openings adjacent the upper end of housing 80, the nut having threaded therein a screw 100 which extends upwardly through the nut and out through a suitable opening in cap element 60, the screw having a pin 102 transversely fixed therein engaging a washer 104 engaged with the under side of cap element 60 to form a thrust bearing for transmitting the weight imposed on the drawbar to screw 100, from which said weight is transmitted to nut 84 and thence to the ground through housing 80 and foot piece 82. It is to be noted that screw 100 and nut 84 are at all times enclosed within housings 78 and 80, so as to exclude dirt, and retain lubrication applied to the parts.

Above cap element 60 screw 100 has a crank generally designated as 106 having a sleeve portion 108 retained thereon by means of a pin 110, by which crank screw 100 can be rotated to cause telescoping of housings 78 and 80, and raising or lowering of the drawbar as desired.

Stand 22 would possibly be an encumbrance with some tractors, particularly on rough terrain, and under such circumstances, by withdrawing pin 66 from opening 52 by means of grip portion 76, the stand may be swung backwardly about pintles 62 and 64 into the position shown in Fig. 12, pin 66 riding on face 50 under pressure of spring 72 until it encounters an opening 112, which it enters by reason of the spring pressure, and retains the stand in the illustrated position clear of any possible contact with the ground.

The drive system for the spreader is best understood by reference to Figs. 1 to 6 inclusive. Starting with Fig. 6, the power is introduced through above mentioned power take-off shaft 24, which needs no further description except to say that it has a coupling 114, which in running condition is coupled to a power take-off shaft on the tractor in well-known manner and rotated by the power of the tractor. Shaft 24 drives a sprocket 116 which drives, through a chain 118 a sprocket 120, forming part of a well-known type of safety clutch mounted on and driving a shaft 122 extending alongside body portion 14 and journaled in a housing 124 enclosing the aforesaid safety clutch and sprocket 120. Shaft 122 is connected by a well-known form of flexible coupling 126 teo a worm shaft 128 journaled in a worm gear housing 130 and having thereon a worm 132, engaged in driving relation with a worm wheel 134 from which the mechanism of the spreader is driven, as will be described presently. Worm wheel 134 is fixed on a sleeve 136 which is journaled for rotation in housing 130 on bearings 138 and 140 in the present instance of the anti-friction type, sleeve 136 projecting from the housing to the left as seen in Fig. 4 and having fixed thereon an apron driving cam 142. It will thus be seen that, whenever worm 132 is rotated, worm wheel 134 will be driven and, through sleeve 136, cam 142 will rotate. Certain advantages of this relation will be described presently.

Sleeve 136 is journaled on and acts as a bearing for a shaft 144, supported at its remote end in a bearing 146, Fig. 2, carried on a part of body portion 14, and connectable by means of a clutch mechanism generally designated as 148 in driven relation with sleeve 136. Thus cam 142 may be driven from worm wheel 134 with or without driving shaft 144, as desired. Shaft 144 in the present instance carries a beater of well-known construction 150 and projects on the right side of the spreader as seen in Fig. 3, carrying a driving wheel or sprocket 152 which drives, through a chain or flexible driving element 154 a sprocket or wheel 156 on a shaft 158 suitably journaled in body portion 14 and carrying a beater 160. Shaft 144 also has fixed thereon a driving sprocket or wheel 162 driving, through a chain or flexible driving element 164 a sprocket or wheel, not shown, fixed on a widespread shaft 166 on which is mounted above-mentioned widespread 30. In this manner the beaters and widespread are driven by and made responsive to clutch 148, and independent of the action of apron driving cam 142. It is contemplated that a single driving wheel or sprocket might be fixed on shaft 144, driving, through a single flexible driving element, a driven sprocket on each of shafts 158 and 166, within the scope of the invention.

The drive to the apron, best shown in Fig. 1, is of a form generally well known. Cam 142 is of suitable irregular shape; a roller or follower 168, journaled on a rocker arm 170, is urged in a direction to press roller 168 against cam 142, by a spring 172 anchored on a brace 174 forming part of above mentioned body portion 14; and a pawl 176 pivoted on arm 170 is pressed by a suitable spring into contact with the teeth on a ratchet wheel 178 fixed on a shaft 180. Shaft 180 is journaled in body portion 14 and has sprockets as 182 engaging and driving an apron 184. Pawl 176 has a guiding roller 186 which rides on a regulating cam 188, thus holding pawl 176 out of engagement with wheel 178 during part of each oscillation of arm 170. At a given point roller 186 runs past the end of cam 188 and engages the next available tooth in the wheel, turning the wheel during the rest of its oscillation. Adjusting the position of cam 188 determines the point at which this happens, and accordingly adjusts the amount of movement of the wheel and of apron 184. The means for adjusting the position of cam 188 will be described later, and it is possible to so adjust cam 188 that roller 186 will never reach the end thereof, whereupon pawl 176 will fail to contact wheel 178 and the drive to apron 184 will be "off" or interrupted.

Figure 4A:
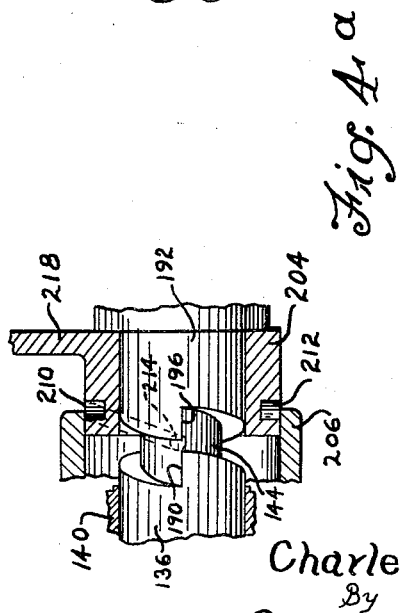
Fig. 4a is a detail of certain mechanism indicated in Fig. 4.

Sleeve 136 has a plurality of spiral ratchet teeth as 190, on the end thereof remote from cam 142, as best seen in Fig. 4a, and a clutch element 192 is slidable on shaft 144 and keyed thereto by a key 194 engaged in a keyway or groove 195 in shaft 144, axial movement to the left, as seen in Fig. 4, engaging ratchet teeth 190 with suitable teeth as 196 on clutch element 192 so that rotation of sleeve 136 will impart rotation, through clutch element 192 and key 194, to shaft 144. Clutch element 192 has an enlarged sleeve portion 198 enclosing a compression spring 200 compressed between the clutch element and a pin 202, so as to continuously urge the clutch element into engagement with teeth 190. In view of the spiral character of the teeth 190 and 196, any tendency for the shaft 144 to overrun the sleeve 136 merely causes a camming action on clutch element 194, which is forced to the right as seen in Fig. 4a, compressing spring 200, the shaft running relatively freely until for example any inertia or momentum in widespread 30 and beaters 150 and 160 has been dissipated. Clutch 192 may also be used for manually controlling the operation of shaft 144.

A collar 204 is journaled on the outside of clutch element 192 and is rotatable within a sleevelike extension 206 on a cover member 208 of housing 130, collar 204 providing cam slots 210 and 212 engaged by pins as 214, said slots being so inclined relatively to the axis of collar 204 that rotation of the collar will cause axial movement thereof. Collar 204 engages the shoulder 216 formed between clutch element 192 and its sleeve portion 198 so that rotation of collar 204 in one direction will cause outward movement of the collar and consequently of clutch element 192, and disengagement of teeth 196 and 190. This will serve to disconnect shaft 144 from sleeve 136 and discontinue rotation of the beaters and widespread. It is to be noted, however, that cam 142 continues to run so that it is possible to operate the apron to clean out the last traces of fertilizer with the beaters stationary. It has been common experience that running the whole mechanism to clean out the last remnants of material would cause it to be thrown in undesirable directions, as onto the tractor. With the present arrangement, when the box is nearly empty it is possible to stop the operation of the widespread and beaters, while continuing the operation of the apron to clean out the machine.

Collar 204 has an arm 218 to which is attached above mentioned rope 32 so that the rope can be manipulated by the tractor operator, without leaving his position on the tractor. Clutch 192, as hereinbefore stated, may overrun or permit shaft 144 to continue to rotate by reason of its momentum by a ratcheting action of teeth 190 and 196. On the other hand, with sleeve 136 running it would seriously strain the mechanism if clutch 192 were suddenly engaged with the beaters and widespread stationary. There is no occasion to engage the clutch under these conditions, but to guard against its being done inadvertently, an over-center retaining device is provided in the form of a guide rod 222 slidable in an eye bracket 224 fixed on cover member 208 and having a pivot portion 226 engaged in a suitable opening in arm 218 spaced from the axis of collar 204 along the arm. A spring 228 on rod 222 is compressed between bracket 224 and pivot portion 226 and tends, in the position shown in Fig. 2 to continue rotation of arm 218 in a counterclockwise direction. Rotation of arm 218 in a clockwise direction, on the other hand, will compress spring 228 until arm 218 has passed a substantially vertical position, after which spring 228 will be permitted to expand and will tend to rotate arm 218 in a clockwise direction. This situation is illustrated in Fig. 1. The rocking of lever 218 may be limited by pins 214 as they reach the ends of their respective cam slots.

It is to be noted that the position of lever 218 shown in Fig. 2 is that in which the beaters are disconnected and stationary, and that this position may be reached by pulling the rope 32 while the tractor and machine are running. On the other hand, it is impossible to reach the Fig. 1 position of the lever from the Fig. 2 position without stopping the tractor and getting off to go to the lever and actuate it by hand. However, the operator will not wish to be in the neighborhood of the widespread when it starts to operate, so he will be sure to stop the power take-off before venturing to engage the clutch by lever 218. Therefore any danger of shock to the machinery by reason of engaging the stationary beaters and widespread with the moving power take-off will be eliminated since the power take-off will not be running. With the clutch arrangement disclosed the operator will engage it with the parts stationary, and when he starts the movement of the tractor, the mechanism of the spreader will be brought up to speed gradually and without shock.

The worm gear mechanism within housing 130 is a precision mechanism, and might be adversely affected by the twisting and weaving which is unavoidable in a structure like a spreader, and for this reason, housing 130 is allowed to "float" on shaft 144, the housing having a hub 230 which has a loose fit in an opening 232 in a plate-like bracket 234 carried on above mentioned brace 174, whereby housing 130 is free to move if shaft 144 shifts with the weaving of body portion 14, so that worm 132 and worm wheel 134 are not forced out of line, such shifting of housing 130 being accommodated by flexible coupling 126 so that shaft 122 is not strained. There is little tendency for housing 130 to become displaced axially of shaft 144, but this is resisted insofar as displacement to the left in Fig. 4 is concerned by engagement of hub 138 with brace 174. For resisting displacement to the right, a lug 233 extends from hub 138 through opening 232 and has a cotter 235 which projects outwardly of the margin of opening 232. In this manner housing 130 is retained in place while floating movement is not prevented by the retaining means, the parts being fabricated to provide slight clearance for movement in all directions. To resist the torque reaction on housing 130 a torque link 236 is extended between a pivot 238 on brace 174 and a pivot 240 on housing 130. Since worm 132 in rotating worm wheel 134 in one direction tends to rotate itself, and accordingly housing 132 with equal force in the opposite direction, it is necessary to resist this force in some manner, and torque link 236, being disposed in the general direction of this force, and transverse to the general direction of shifting of the housing as a result of weaving of body portion 14 of the spreader, resists the torque reaction without interfering with the freedom of the housing to float on shaft 144.

The adjustment, hereinbefore mentioned, of cam 188 is effected from the front of the machine by means of hand lever 26, cam 188 having an upwardly extending arm 240 pivoted at 242 to a rod 244 extending along the box portion 14 and pivoted to an upwardly directed lever arm 246, Fig. 1, so that swinging of the arm causes longitudinal movement of rod 244 and corresponding swinging of arm 240. Thus adjusting of arm 246 causes the desired adjustment of arm 240 and cam 188. Arm 246 is fixed with or forms a part of a rockshaft portion 248, Fig. 6, and is actuated by above mentioned lever 26, best seen in Figs. 6 to 10 inclusive.

Rockshaft 248 is preferably supported in the angle between a false front wall 250 of body portion 14 and a forwardly directed flange or lip 252 thereof, angular strap portions 254 fastened to wall portion 250 by bolts or the like 256 retaining the rockshaft in the angle against displacement and for ready and easy rocking movement. Rockshaft 248 has a transverse portion 258 fixed or integral therewith, in the present instance formed by bending the rockshaft, and forming the base or lowermost part of lever 26.

Transverse portion 258 extends forwardly and upwardly from rockshaft 248 toward the position of an operator on a tractor (not shown) coupled to the spreader and has telescopically and rotatively related thereto an extension 260, preferably tubular in form, while, outside of transverse portion 258 is disposed a latch sleeve 262 which encloses the upper extremity of transverse portion 258 and extends beyond it for a short distance, fitting about tubular extension 260. Means, in the present instance a cotter 264, extends through the sleeve 262 and extension 260, locking the two together for rotation in relation to transverse portion 258. Another cotter 266 extends through sleeve 262 and transverse portion 258 to secure the latter against axial movement relatively to each other, cotter 266, however, extending through slotted holes as 268 so as to provide for a substantial amount of rotation of the sleeve on the transverse portion. Thus it will be apparent that the parts are secured together, and that rotation of extension 260 will cause similar rotation of sleeve 262, while up-and-down swinging of extension 260 will cause similar up-and-down swinging of transverse portion 258, and rocking of rockshaft 248. A spring 270 is anchored to a cotter 272, wound around transverse portion 258 and has a finger 274 engaged in a recess 276 in sleeve 262, spring 270 being biased to continuously urge sleeve 262 in a counterclockwise direction, as seen in Figs. 6, 8, and 10.

Sleeve 262 has a wing arm portion 278 in the form generally of a web, substantially tangent to the outer diameter of the sleeve and extending in the direction of swinging of the lever 26, and at its outer margin, wing arm 278 has a lip or latching portion 280, which in the present instance is in the form of a rib of substantial length which, in the usual working position of the parts slants away from transverse portion 258 so as to extend more nearly horizontally than portion 258. Lip 280 engages a quadrant or rack 282, which, by virtue of the inclined position of lip 280, may be made in the form of a straight piece of material, and it is provided with a plurality of notches into which the lip may enter to secure the lever 26 against moving. It is to be noted that, since rack 282 is straight, it may be secured directly to the front wall 284 of body portion 14, without the necessity for any costly or cumbersome brackets, and because of the fact that lip 280 is long, it will not swing out of range of rack 282 as it moves up and down with adjustments of the lever.

The angle between lip 280 and rack 282 changes substantially from one position of lever 26 to another, and the notches, in order to hold lip 280 without looseness are made of varying widths to receive the lip at its various angles without excessive looseness. Thus notch 286 is relatively wide to receive lip 280 when tilted upwardly at a sharp angle, while notches 288 and 290 are relatively narrow, to fit the lip when it is nearly horizontal. Lip 280 is engaged with one or another of the notches by the turning tendency of spring 270, and to change the adjustment of the lever, and therefore the feed of the spreader, extension 260 is rotated in a clockwise direction, bringing the parts to the position shown in Fig. 10, whereupon lever 26 may be swung up or down to the desired position and released at which time spring 270 will rotate the parts and engage lip 280 with the nearest notch and maintain the adjustment.

It is contemplated that the same principle could be used in a structure with a curved quadrant, in which case the notches could be uniform in width, and the lip could be shorter. Such a construction, however, would be more costly than the present, and not so convenient to mount in a spreader of the present character.

Extension 260 receives therein a rod 292 which projects from the upper end thereof and has a hand grip portion 294 transverse to the main portion of the rod so that the operator may readily rotate the rod for withdrawing detent or lip 280 from the notches in quadrant 282. Rod 292 is secured in extension 260 by means of a cotter 296 engaged in suitable openings in the rod and extension 260, and a plurality of additional opening 298 and 300 are provided in which cotter 296 can be inserted with rod 292 in different adjusted positions. In this way it is convenient to adjust the effective length of lever 26 to suit various tractors and operators.

A pair of spaced washers 302 provided on rod 292 between which rope 32 may be secured are held in place by cotters 304, thus providing a support for the rope within easy reach of the operator.

By reason of the rugged character of the housing 130 by worm gear 134, it is possible to provide an oil bath into which worm wheel 134 dips and carries the lubricant to the internal working parts and bearings. A testing and filler plug 306 is provided on cover 208 for use in maintaining the oil bath in well-known manner.

The operation is thought to be clear from the foregoing description, sufficient to say, the height of the drawbar is adjusted by means of stand 22 for ready coupling of the device to a tractor; power take-off shaft 24 is connected, stand 22 is latched in the Fig. 12 position after being raised by crank 106, lever 218 is placed in the Fig. 2 position and lever 26 in its uppermost notch. This disables all of the machinery. The spreader is then loaded and taken to the field. When it is desired to spread, the tractor and power take-off are stopped momentarily while the operator proceeds to the rear and places lever 218 in the position shown in Fig. 1. This allows clutch element 192 to engage sleeve 136. The tractor and power take-off are then started whereupon the beaters and widespread will run. Lever 26 is then adjusted by turning slightly and swinging to the desired position whereupon apron 184 will feed material into the beaters at the desired rate. When the load is exhausted, a pull on rope 32 swings lever 218 to the Fig. 2 position and stops the motion of the beaters and widespread, but apron 184, being independent of clutch 192, continues to run and clear out the last traces of material from body portion 14 without their being thrown on the tractor and operator.

If the tractor is suddenly stopped while the beaters and widespread are running rapidly, clutch 192 acts as a ratchet and allows these parts to overrun without imposing their considerable momentum on the tractor. Since the clutch 192 cannot be thrown in from the tractor, it is unlikely that the beaters and widespread will be engaged while stationary with rapidly rotating power take-off parts with destruction of or damage to the machinery.

The above being a complete description of an illustrative embodiment of the invention, what is claimed as new and desired to be secured by Letters Patent of the United States is:

1. In a spreader having a box-like body portion, and a feed apron in said body portion, a drive system for said spreader including a power input shaft disposed alongside said body portion, a transverse shaft disposed across one end of said body portion and supported at one end by a bearing supported on said body portion remote from said power input shaft and at its other end by brace means secured to the body portion, a sleeve journaled on said transverse shaft adjacent the other end of said transverse shaft, a worm gear housing journaled on said sleeve, said sleeve extending along said shaft to a point outside of said housing, a worm gear in said housing fixed on said sleeve, an apron actuating cam on said sleeve outside of said housing, a worm within said housing engaged with said worm gear connected to and driven by said power input shaft, clutch means of the uni-directional overrunning type connected in driving relation between said sleeve and said transverse shaft, spring means biasing said clutch means toward engaged position, means including a member mounted on a clutch member and shiftable relative to said housing to remove said clutch means from engaged position for stopping rotation of said transverse shaft while said apron actuating cam continues to run in response to rotation of said worm gear and said sleeve, a beater shaft spaced from said transverse shaft and journaled on said body portion, a widespread shaft spaced from said transverse shaft and journaled on said body portion, a driving wheel on said transverse shaft remote from said housing, driven wheels on said widespread and beater shafts, flexible driving means engaged with said wheels for driving said beater shaft and said widespread shaft from rotation of said transverse shaft, and interengaging means between said apron and the apron actuating cam for driving said feed apron from rotations of said apron actuating cam.

2. In a spreader having a box-like body portion, and a feed apron in said body portion, a drive system for said spreader including a power input shaft disposed alongside said body portion, a transverse shaft disposed across one end of said body portion and supported at one end by a bearing supported on said body portion remote from said power input shaft and at its other end by brace means secured to the body portion, a sleeve journaled on said transverse shaft adjacent the other end of said transverse shaft, a worm gear housing journaled on said sleeve, said sleeve extending along said shaft to a point outside of said housing, a worm gear in said housing fixed on said sleeve, an apron actuating cam on said sleeve outside of said housing, a worm within said housing engaged with said worm gear connected to and driven by said power input shaft, clutch means connected in driving relation between said sleeve and said transverse shaft, spring means abutting said clutch means to maintain the clutch in engagement, means including a member mounted on a clutch member and shiftable relative to said housing to remove said clutch means from engaged position for stopping rotation of said transverse shaft while said apron actuating cam continues to run in response to rotation of said worm gear and said sleeve, flexible driving means interengaging the apron and apron actuating cam for driving the apron in response to rotation of said cam, a widespread shaft spaced from said transverse shaft and journaled on said body portion, and means connected for driving said widespread shaft from rotation of said transverse shaft.

3. In a spreader having a box-like body portion, and a feed apron in said body portion, a drive system for said spreader including a power input shaft disposed alongside said body portion, a transverse shaft disposed across one end of said body portion and supported at one end by a bearing supported on said body portion remote from said power input shaft, a sleeve journaled on said transverse shaft adjacent the other end of said transverse shaft, a worm gear housing journaled on said sleeve, said sleeve extending along said shaft to a point outside of said housing, a worm gear in said housing fixed on said sleeve, a hub on said housing, an apron actuating cam on said sleeve outside of said housing, a worm within said housing engaged with said worm gear connected to and driven by said power input shaft, clutch means of the uni-directional overrunning type connected in driving relation between said sleeve and said transverse shaft, spring means biasing said clutch means toward engaged position, means including a member mounted on a clutch member and shiftable relative to said housing to remove said clutch means from engaged position for stopping rotation of said transverse shaft while said apron actuating cam continues to run in response to rotation of said worm gear and said sleeve, means supporting said housing sleeve and transverse shaft relative to said body portion whereby the housing is free to float relative to the transverse shaft to prevent distortion of the worm gear mechanism, said last mentioned means including a plate-like element supported on said body portion and providing an opening in which said hub is loosely disposed, means restraining said hub against removal from said opening, a beater shaft spaced from said transverse shaft and journaled on said body portion, a widespread shaft spaced from said transverse shaft and journaled on said body portion, a driving wheel on said transverse shaft remote from said housing, a driven wheel on said widespread shaft in alignment with said driving wheel, a driven wheel on said beater shaft in alignment with said driving and driven wheels, a flexible driving element engaged with said wheels for driving said beater shaft and said widespread shaft from rotation of said transverse shaft, and interengaging means between said apron and the apron actuating cam for driving said feed apron from rotations of said apron actuating cam.

References Cited in the file of this patent
UNITED STATES PATENTS

| | | |
|---|---|---|
| 1,843,875 | Kendall et al. | Feb. 2, 1932 |
| 1,945,125 | Swanson et al. | Jan. 30, 1934 |
| 2,016,436 | Jahnke | Oct. 8, 1935 |
| 2,427,804 | Mueller | Sept. 23, 1947 |
| 2,555,283 | Barker | May 29, 1951 |
| 2,563,418 | Peter et al. | Aug. 7, 1951 |
| 2,699,337 | Best | Jan. 11, 1955 |
| 2,750,205 | Russell | June 12, 1956 |
| 2,769,641 | Brown | Nov. 6, 1956 |